United States Patent
Hayes

(10) Patent No.: US 6,264,084 B1
(45) Date of Patent: Jul. 24, 2001

(54) SPORT VEHICLE BAG WITH PROTECTIVE PANEL

(75) Inventor: Christopher J. Hayes, Rockford, MI (US)

(73) Assignee: Specialty Sports Limited, Rockford, MI (US)

( * ) Notice: Subject to any disclaimer, the term of this patent is extended or adjusted under 35 U.S.C. 154(b) by 0 days.

(21) Appl. No.: 09/368,678

(22) Filed: Aug. 5, 1999

(51) Int. Cl.[7] ...................................................... B60R 9/06
(52) U.S. Cl. ........................... 224/408; 190/111; 190/125; 383/2; 383/110; 383/113
(58) Field of Search ..................... 224/408; 190/111, 190/125; 383/2, 113, 110

(56) References Cited

U.S. PATENT DOCUMENTS

| | | | |
|---|---|---|---|
| 2,432,365 | * 12/1947 | Allen | 190/125 |
| 3,335,827 | * 8/1967 | Hofferbert | 190/125 |
| 3,901,360 | * 8/1975 | Cook | 190/125 |
| 4,099,656 | * 7/1978 | Neumann et al. | 383/113 |
| 4,716,947 | * 1/1988 | Haddock | 383/111 |
| 4,921,151 | * 5/1990 | Duvall | 190/125 |
| 4,955,516 | * 9/1990 | Satterfield | 383/110 |
| 5,090,526 | * 2/1992 | Jacober | 190/125 |
| 5,400,610 | * 3/1995 | Macedo | 62/457.2 |
| 5,403,095 | * 4/1995 | Melk | 383/110 |
| 5,490,396 | * 2/1996 | Morris | 62/457.2 |
| 5,497,919 | * 3/1996 | Klinger | 383/2 |

\* cited by examiner

*Primary Examiner*—Stephen P. Garbe
(74) *Attorney, Agent, or Firm*—Price, Heneveld, Cooper, DeWitt & Litton

(57) ABSTRACT

A snowmobile trunk bag which exhibits better wear resistance in those areas which are subject to being bombarded with snow, ice and debris during operation of the snowmobile includes a plurality of fabric panels defining an enclosed storage space and exterior surfaces of the bag, a position retainer secured to one of the panels to allow the snowmobile trunk bag to be properly positioned and retained when the bag is secured to a snowmobile, and a plurality of waterproof overlays. Each of the waterproof overlays is secured to a selected exterior surface of the snowmobile trunk bag to provide reinforcement against wear and resistance to moisture penetration at the selected exterior surfaces.

5 Claims, 1 Drawing Sheet

SPORT VEHICLE BAG WITH PROTECTIVE PANEL

FIELD OF THE INVENTION

This invention relates to the field of sport vehicle luggage bags.

BACKGROUND OF THE INVENTION

Snowmobile trunk bags are relatively large bags which are securable to a rearward portion of a snowmobile to provide a relatively large storage space for various items which may be needed by a snowmobiler during a snowmobile trip, such as cameras, clothing, food, beverages and sporting gear. Snowmobile trunk bags have been very popular with snowmobile enthuses for many years. However, there are certain problems associated with the use of conventional snowmobile bags.

Snowmobile trunk bags generally comprise a plurality of fabric panels, such as nylon fabric panels, which are thermally fused, stitched, or otherwise connected together near their edges to form an enclosed storage space. Although nylon fabrics are relatively durable, the under surface areas of a snowmobile trunk bag which are exposed tend to wear heavily on account of snow, ice and debris which may be flung upwardly from the snowmobile treads against such surfaces. Accordingly, it would be desirable to design a snowmobile trunk bag which exhibits better wear resistance in those areas which are subject to being bombarded with snow, ice and debris by the snowmobile treads during operation of the snowmobile.

Another problem with a conventional snowmobile bag consisting of nylon fabric panels is that snow and ice which is flung up against the exposed under surfaces of the bag tend to stick and accumulate on such surfaces.

A further problem with a conventional snowmobile bag consisting of nylon fabric panels is that while nylon fabric is somewhat resistant to water, it is not waterproof. As a result, when wet snow or slush is flung up against exposed portions of the bag, the fabric can become saturated with moisture, and such moisture can eventually penetrate the nylon fabric and allow moisture to accumulate on items contained in the bag.

SUMMARY OF THE INVENTION

The invention overcomes the problems associated with known snowmobile trunk bags constructed from a plurality of nylon fabric panels. In particular, the invention provides luggage for a sport vehicle which exhibits improved durability, resistance to moisture penetration, and reduced accumulation of ice and snow at selected exterior surfaces of the luggage.

The luggage of this invention includes a bag having a plurality of fabric panels defining an enclosed storage space and exterior surfaces of the bag, and at least one waterproof overlay on at least a portion of the exterior surface defined by the plurality of fabric panels. In accordance with a further aspect of the invention, the waterproof overlay has a non-stick or low-stick surface which repels ice and snow, and therefore is highly resistant to accumulation of ice and snow.

DESCRIPTION OF THE PREFERRED EMBODIMENTS

Figure 1:
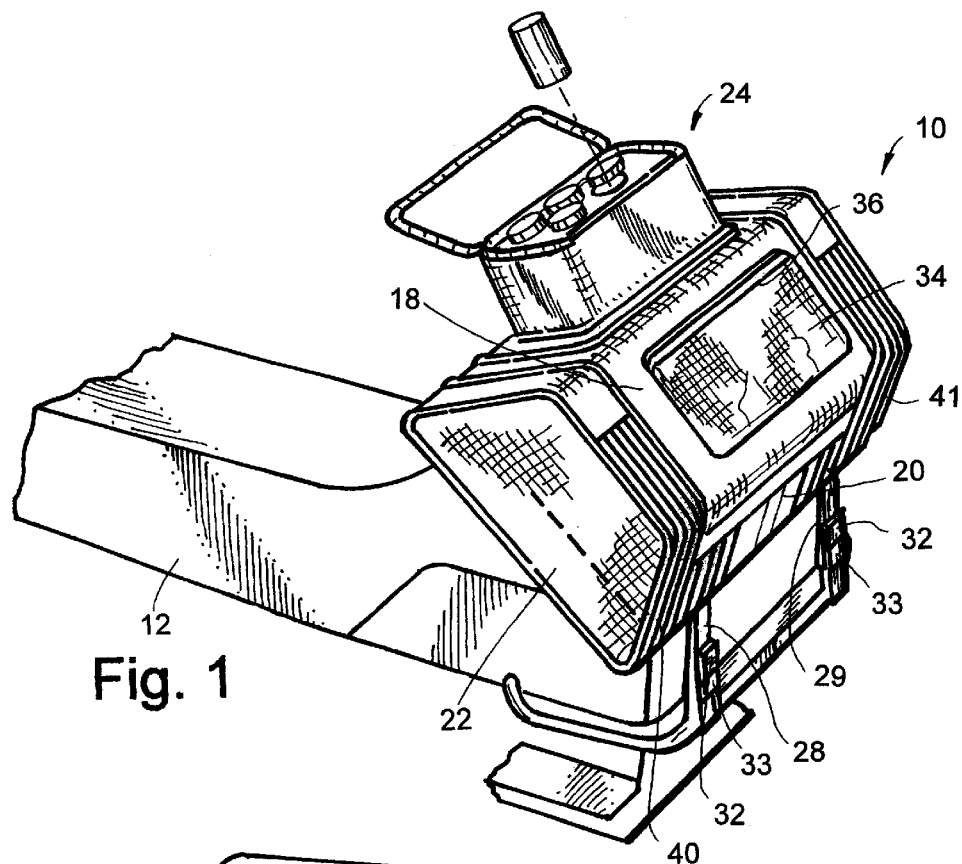
FIG. 1 is a rear perspective view of a snowmobile trunk bag including waterproof overlays on selected portions of the exterior surface of fabric panels defining the bag.
Figure 2:
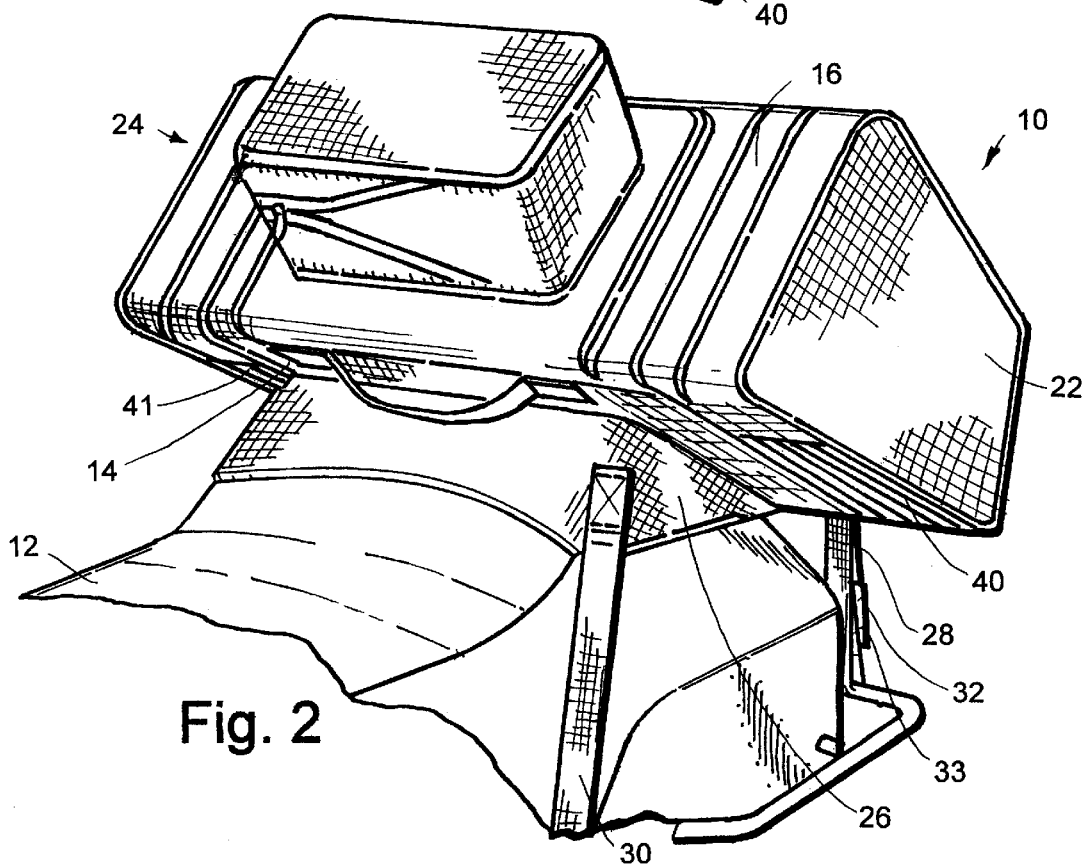
FIG. 2 is a front perspective view of the snowmobile trunk bag shown in FIG. 1.

In FIG. 1, there is shown a snowmobile trunk bag 10 mounted on a rear portion of a snowmobile 12. Referring to FIGS. 1 and 2, snowmobile trunk bag 10 includes a forwardly and downwardly facing bottom panel 14, a forwardly and upwardly facing top panel 16, a rearwardly and upwardly facing top panel 18, a rearwardly and downwardly facing bottom panel 20, a left side panel 22, and a right side panel 24. Panels 16, 18, 20, 22 and 24 define an enclosed storage space for carrying various items which a snowmobiler may need during a snowmobile trip.

Secured to forwardly and downwardly facing bottom panel 14 is a position retainer 26 which is fitted to conform to the shape of a rearward bump portion of the snowmobile seat. Position retainer 26 allows snowmobile trunk bag 10 to be properly positioned and retained while snowmobile trunk bag 10 is being secured to snowmobile 12. Position retainer 26 also helps prevent snowmobile bag 10 from shifting during operation of the snowmobile after snowmobile trunk bag 10 has been installed on snowmobile 12. Snowmobile bag 10 is secured to snowmobile 12 in a conventional manner using rear straps 28, 29 and front straps 30 (only one of which is shown). In the illustrated embodiment, straps 28, 29 and 30 are provided with quick-connect buckle connectors 32 which mate with a complementary connector 33 fixed to snowmobile 12. Snowmobile trunk bag 10 includes an access panel or door 34 which can be opened and closed as desired using zipper 36.

Panels 14, 16, 18, 20, 22 and 24 are woven or knitted flexible fabric panels. A preferred material is nylon. A suitable commercially available nylon fabric exhibiting good durability is CORDURA® nylon fabric.

Although selected woven and/or knitted fabrics, such as CORDURA® nylon fabric, exhibit good durability, snowmobile trunk bags made of such material tend to show excessive wear at selected exterior surfaces after normal use due to snow, ice, dirt, etc. being flung up against certain exterior surfaces of the snowmobile trunk bag 10. Areas which are particularly susceptible to excessive wear include exposed downwardly facing surfaces, particularly exposed downwardly facing surfaces near the outboard edges of trunk bag 10. These same surfaces are also particularly subject to accumulation of ice and snow, and to moisture penetration, such as when wet snow or slush is thrown against such surfaces by the snowmobile treads during operation of the snowmobile. In order to protect such surfaces against excessive wear, accumulation of snow and/or ice, and against moisture penetration, at least one waterproof overlay 40, 41 is provided on at least a portion of the exterior surface defined by the plurality of fabric panels 14, 18, 20. Overlays 40 and 41 provide additional reinforcement against excessive wear, and are resistant to moisture penetration and accumulation of ice and/or snow. Overlays 40, 41 are preferably made from a sheet of flexible, non-porous thermoplastic material of suitable thickness to exhibit high moisture resistance and wear-resistance. An example of a preferred overlay material is polyvinylchloride.

It will be apparent to those skilled in the art that various modifications to the preferred embodiment of the invention as described herein can be made without departing from the spirit or scope of the invention as defined by the appended claims.

What is claimed is:

1. A snowmobile trunk bag, comprising:

a plurality of fabric panels defining an enclosed storage space and exterior surfaces of the snowmobile trunk bag;

a position retainer secured to one of said panels, said position retainer having a concavity adapted to conform to a shape of a rearward bump portion of a snowmobile seat to allow the snowmobile trunk bag to be properly positioned and retained when the snowmobile trunk bag is secured to a snowmobile; and a plurality of waterproof overlays, each of said waterproof overlays being secured to a selected exterior surface of the snowmobile trunk bag to provide reinforcement against wear and resistance to moisture penetration at said selected exterior surfaces.

2. The bag of claim 1, wherein the plurality of fabric panels are made of a woven or knitted fabric, and the overlays are made of a flexible, non-porous thermoplastic material.

3. A snowmobile trunk bag, comprising:

a plurality of fabric panels defining an enclosed storage space and exterior surfaces of the snowmobile trunk bag;

a position retainer secured to one of said panels, said position retainer having a concavity adapted to conform to a shape of a rearward bump portion of a snowmobile seat to allow the snowmobile trunk bag to be properly positioned and retained when the snowmobile trunk bag is secured to a snowmobile; and a plurality of waterproof overlays, each of said waterproof overlays being secured to a selected exterior surface of the snowmobile trunk bag to provide reinforcement against wear and resistance to moisture penetration at said selected exterior surfaces, wherein each of said plurality of overlays is located on a bottom panel of the bag.

4. A snowmobile trunk bag, comprising:

a plurality of fabric panels defining an enclosed storage space and exterior surfaces of the snowmobile trunk bag;

a position retainer secured to one of said panels, said position retainer having a concavity adapted to conform to a shape of a rearward bump portion of a snowmobile seat to allow the snowmobile trunk bag to be properly positioned and retained when the snowmobile trunk bag is secured to a snowmobile;

a plurality of waterproof overlays, each of said waterproof overlays being secured to a selected exterior surface of the snowmobile trunk bag to provide reinforcement against wear and resistance to moisture penetration at said selected exterior surfaces; and a plurality of straps provided with quick-connect buckle connectors mateable with complementary connectors fixed to a snowmobile.

5. A snowmobile trunk bag, comprising:

a plurality of fabric panels defining an enclosed storage space and exterior surfaces of the snowmobile trunk bag, said fabric panels made of a nylon fabric;

a position retainer secured to one of said panels, said position retainer having a concavity adapted to conform to a shape of a rearward bump portion of a snowmobile seat to allow the snowmobile trunk bag to be properly positioned and retained when the snowmobile trunk bag is secured to a snowmobile;

a plurality of straps fixed to the snowmobile trunk bag, each of said straps provided with a quick-connect buckle connector mateable with a complementary connector fixed to a snowmobile; and a plurality of waterproof overlays, each of said waterproof overlays being secured to a selected exterior surface of the snowmobile trunk bag to provide reinforcement against wear and resistance to moisture penetration at said selected exterior surfaces, said plurality of overlays made of a flexible, non-porous thermoplastic material.

\* \* \* \* \*